United States Patent
Gheith et al.

(10) Patent No.: US 8,954,707 B2
(45) Date of Patent: Feb. 10, 2015

(54) AUTOMATIC USE OF LARGE PAGES

(75) Inventors: Ahmed Gheith, Austin, TX (US); Eric Van Hensbergen, Austin, TX (US); James Xenidis, Cedar Park, TX (US)

(73) Assignee: International Business Machines Corporation, Armonk, NY (US)

(*) Notice: Subject to any disclaimer, the term of this patent is extended or adjusted under 35 U.S.C. 154(b) by 183 days.

(21) Appl. No.: 13/565,985

(22) Filed: Aug. 3, 2012

(65) Prior Publication Data

US 2014/0040577 A1    Feb. 6, 2014

(51) Int. Cl.
*G06F 12/10* (2006.01)

(52) U.S. Cl.
USPC .... 711/202; 711/170; 711/206; 711/E12.103; 711/E12.059

(58) Field of Classification Search
CPC ..... G06F 12/02; G06F 12/0292; G06F 12/10; G06F 12/1009; G06F 2212/652; G06F 2212/7201; G06F 12/1027; G06F 2212/654
USPC .................. 711/202, 206, 162, 170, E12.103, 711/E12.059
See application file for complete search history.

(56) References Cited

U.S. PATENT DOCUMENTS

| | | |
|---|---|---|
| 7,917,725 B2 | 3/2011 | Stecher |
| 2006/0259735 A1 | 11/2006 | Anand et al. |
| 2007/0136506 A1 | 6/2007 | Traut et al. |
| 2007/0288719 A1* | 12/2007 | Cholleti et al. ............... 711/170 |
| 2011/0145541 A1 | 6/2011 | Ito et al. |

OTHER PUBLICATIONS

IBM Corporation, "Intelligent and Automated/Re-allocation of Paging Space to Enhance the Overall Operating System Performance", www.ip.com, No. IPCOM000153048D, May 22, 2007, 4 pages.
Christopher, KW et al., "Profiling Technique for Memory References within Individual Pages on Paging Based Virtual Memory Systems", www.ip.com, No. IPCOM000109356D, Mar. 23, 2005, 7 pages.
Corbet, Jonathan, "Transparent huge pages in 2.6.38", LWN.net, http://lwn.net/Articles/423584/, Jan. 19, 2011, 5 pages.
O'Quin, JT et al., "Virtual Memory Page Space Allocation", www.ip.com, No. IPCOM000062403D, Mar. 9, 2005, 2 pages.

* cited by examiner

*Primary Examiner* — Jasmine Song
(74) *Attorney, Agent, or Firm* — Stephen R. Tkacs; Stephen J. Walder, Jr.; William J. Stock

(57) ABSTRACT

A mechanism is provided for automatic use of large pages. An operating system loader performs aggressive contiguous allocation followed by demand paging of small pages into a best-effort contiguous and naturally aligned physical address range sized for a large page. The operating system detects when the large page is fully populated and switches the mapping to use large pages. If the operating system runs low on memory, the operating system can free portions and degrade gracefully.

20 Claims, 3 Drawing Sheets

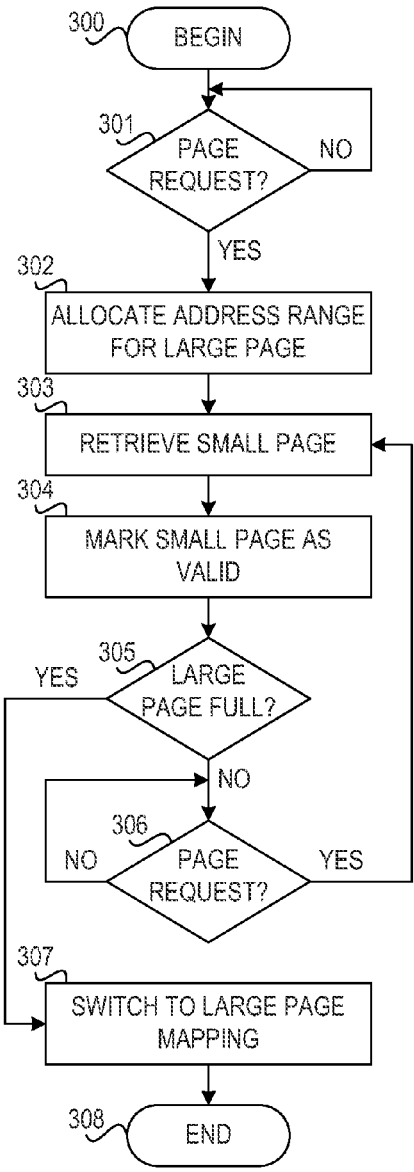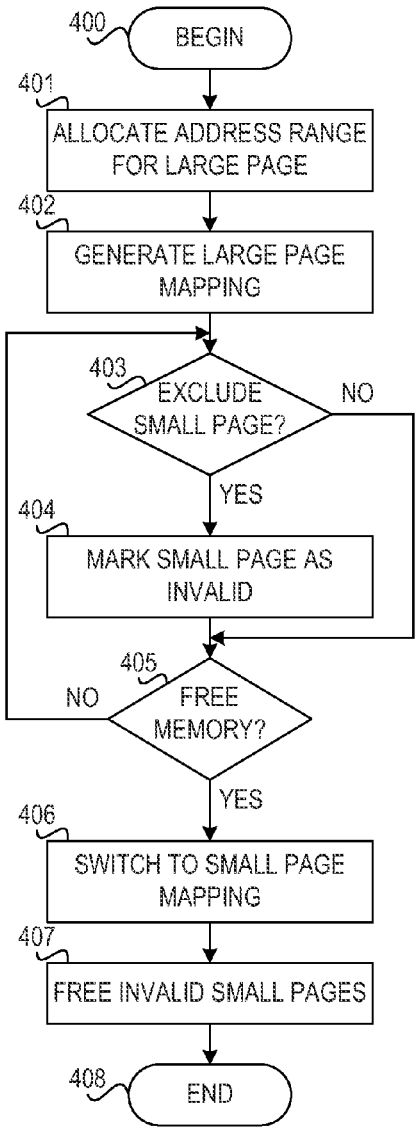

AUTOMATIC USE OF LARGE PAGES

BACKGROUND

The present application relates generally to an improved data processing apparatus and method and more specifically to mechanisms for automatic use of large pages.

A page, memory page, or virtual page is a fixed-length contiguous block of virtual memory that is the smallest unit of data for memory allocation performed by the operating system for a program and transfer between main memory and any other auxiliary store, such as a hard disk drive. Virtual memory allows a page that does not currently reside in main memory to be addressed and used. If a program tries to access a location in such a page, an exception called a page fault is generated. The hardware or operating system is notified and loads the required page from the auxiliary store automatically. A program addressing the memory has no knowledge of a page fault or a process following it. Thus a program can address more (virtual) RAM than physically exists in the computer. A transfer of pages between main memory and an auxiliary store, such as a hard disk drive, is referred to as paging or swapping Traditionally, pages in a system had uniform size, for example 4096 bytes. However, processor designs often allow two or more, sometimes simultaneous, page sizes due to the benefits and penalties. There are several points that can factor into choosing the best page size. When transferring from disk, much of the delay is caused by seek time, the time it takes to correctly position the read/write heads above the disk platters. Because of this, large sequential transfers are more efficient than several smaller transfers. Transferring the same amount of data from disk to memory often requires less time with larger pages than with smaller pages.

When two processes share a physical page, the processes may have two different virtual addresses to that page. Copy-on-write is an optimization strategy used in computer programming. The fundamental idea is that if multiple callers ask for resources that are initially indistinguishable, they can all be given pointers to the same resource. For instance, when two processes share a physical page of memory, the processes may have two different virtual addresses to the same physical page. This state of affairs can be maintained until a caller tries to modify its "copy" of the resource, at which point a separate (private) copy is made for that caller to prevent its changes from becoming visible to everyone else. All of this happens transparently to the callers. The primary advantage is that if no caller ever makes any modifications, no private copy need ever be created.

Large pages prohibit efficient demand paging because of all-or-nothing property of large pages. For 4 KB pages, copy-on-write and/or demand-based fetching is reasonable; however, for 1 GB pages, copy-on-write and/or demand-based fetching is not reasonable.

SUMMARY

In one illustrative embodiment, a method, in a data processing system, is provided for automatic use of large pages. The method comprises responsive to a page request, allocating an address range for a large page in physical memory. The method further comprises retrieving a small page into a corresponding portion of physical memory for the small page within the address range for the large page. The method further comprises mapping the small page using a small page mapping table. The method further comprises responsive to a subsequent page-in of a small page to the address range for the large page resulting in the large page being fully populated, mapping the large page using a large page mapping table. The method further comprises responsive to the subsequent page-in resulting in the large page being fully populated, switching to large page mapping for subsequent accesses to the address range for the large page.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is a flowchart illustrating operation of a mechanism for automatically using large pages in accordance with an illustrative embodiment; and FIG. 4 is a flowchart illustrating operation of a mechanism for decomposing a large page to small page mapping in accordance with an illustrative embodiment.

DETAILED DESCRIPTION

The illustrative embodiments provide a mechanism for automatic use of large pages. In the illustrative embodiments, an operating system loader performs aggressive contiguous allocation followed by demand paging and/or prefetching of small pages into a best-effort contiguous and naturally aligned physical address range sized for a large page. The operating system detects when the large page is fully populated and switches the mapping to use large pages.

In one illustrative embodiment, the operating system may start with large pages and only validate small pages that are paged in. The operating system may exclude small pages out by masking page protection bits to show excluded pages as invalid. If the operating system runs low on memory, the operating system can free portions and degrade gracefully. In one example embodiment, the operating system may decompose a large page and switch to small page mapping responsive to a copy-on-write condition and/or demand-based fetching.

Figure 1:
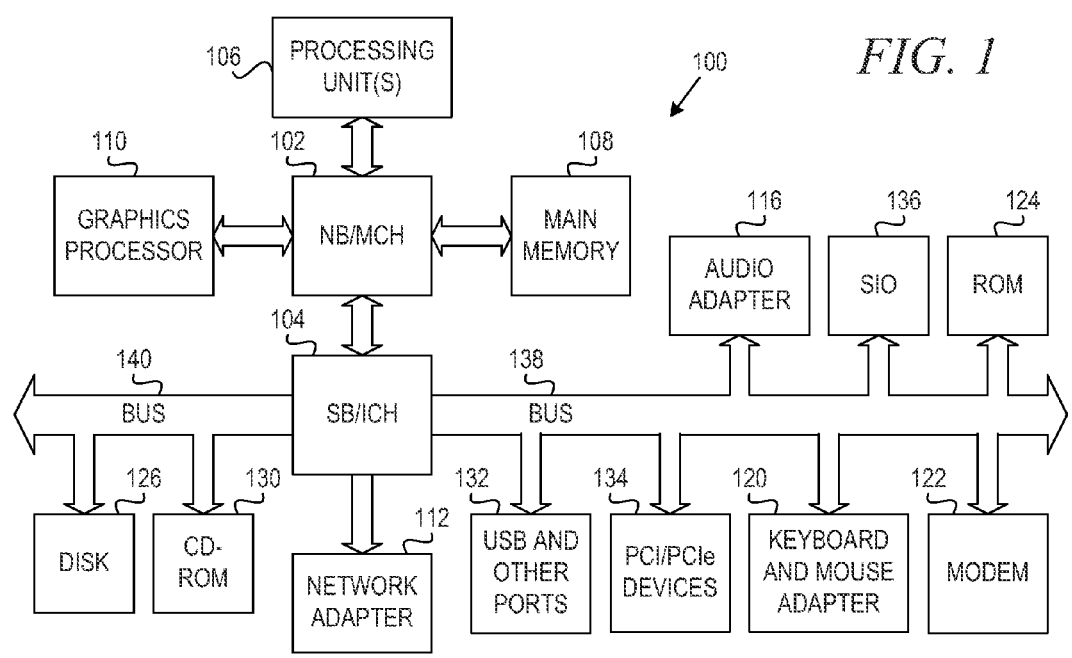
FIG. 1 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIG. 1 is provided hereafter as example environments in which aspects of the illustrative embodiments may be implemented. It should be appreciated that FIG. 1 is only an example and is not intended to assert or imply any limitation with regard to the environments in which aspects or embodiments of the present invention may be implemented. Many modifications to the depicted environment may be made without departing from the spirit and scope of the present invention.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 100 (Java is a trademark of Oracle and/or its affiliates.).

As a server, data processing system 100 may be, for example, an IBM® eServer™ System p® computer system, running the Advanced Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system flies and/or user-generated data, for example. Essentially, data processing system 100 may be any known or later developed data processing system without architectural limitation.

Figure 2A:
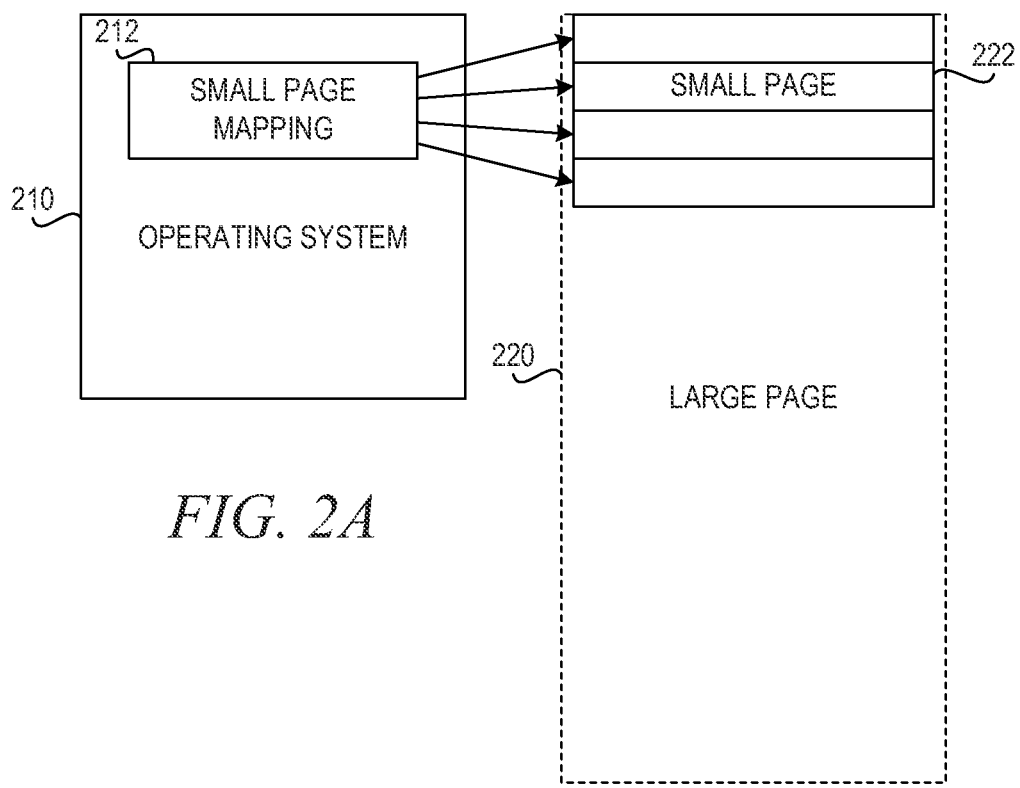
FIGS. 2A and 2B are block diagrams illustrating automatic use of large pages in accordance with an illustrative embodiment.
Figure 2B:
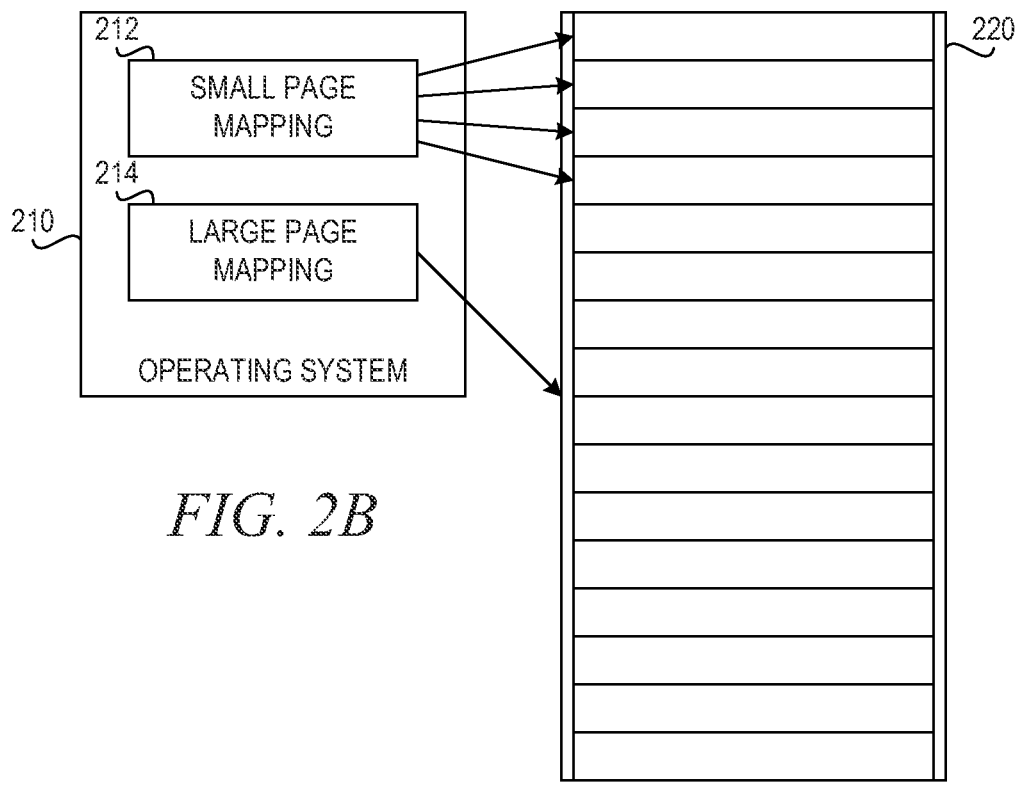

FIGS. 2A and 2B are block diagrams illustrating automatic use of large pages in accordance with an illustrative embodiment. With reference to FIG. 2A, operating system 210, which may run on a processor, such as processing unit 106 in FIG. 1, performs aggressive contiguous allocation of a physical address range in memory, such as main memory 108 in FIG. 1. Operating system (OS) 210 allocates a contiguous and naturally aligned physical address range sized for a large page 220. As an example, a large page size may be 1 GB.

OS 210 then performs demand paging of small pages 222 into the address range 220. OS 210 comprises small page mapping 212 mapping page-in small pages 222 to physical addresses in the memory. A small page may be 4 KB, for example. Small page mapping 212 may also include page protection bits (not shown) for each small page to identity whether the page is valid or invalid. A page mapping may also be referred to as an entry in a page table or page protection table. Software managed page table entries typically include some representation of the virtual memory address, the corresponding physical page address, the page size, and page protection bits and access bits.

Turning to FIG. 2B, OS 210 may determine when the large page 220 is fully populated. OS 210 may determine that all small pages are mapped to contiguous and naturally aligned addresses in the large page memory range 220 such that large page 220 is fully populated by valid small pages, OS 210 may then switch to large page mapping 214, which maps large pages to physical addresses in memory. Large page mapping 214 may also include a page protection bit for each large page to identify whether the page is valid or invalid.

In accordance with one illustrative embodiment, OS 210 may use small page mapping 212 and large page mapping 214 simultaneously as a layered overlay. In this embodiment, a layered overlay is the use of multiple mappings to the same memory regions at different granularities. Thus, OS 210 may use large page mapping 214 and fall back to small page mapping 212 in response to excluding a small page from the large page. For example, OS 210 may fall back to small page mapping 212 responsive to a copy-on-write operation and/or demand-based fetching.

OS 210 may exclude a small page in small page mapping 212 by setting a page protection bit to an invalid state. Responsive to the operating system kernel needing to free memory, OS 210 may degrade gracefully from large page mapping 214 to small page mapping 212. OS 210 may then free the physical memory associated with invalid small pages.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 3 is a flowchart illustrating operation of a mechanism for automatically using large pages in accordance with an illustrative embodiment. Operation begins in block 300, and the mechanism determines whether a page request is received (block 301). A page request may be a memory access request resulting in a page fault. For the purposes of the aspects of this embodiment, the mechanism treats each such instance as a request for a small page. If the mechanism does not receive a page request in block 301, operation of block 301 repeats until a page request is received.

If a page request is received in block 301, the mechanism allocates a contiguous and naturally aligned physical address range for a large page (block 302). The mechanism then retrieves the small page into a corresponding small page within the physical address range (block 303) and marks the small page as valid (block 304). The mechanism then determines whether the large page address range is full (block 305). The mechanism determines whether the large page is fill by determining whether the large page address range is fully populated with valid small pages.

If the large page address range is not full, the mechanism determines whether a page request is received (block 306). A page request may be a memory access request resulting in a page fault. For the purposes of the aspects of this embodiment, the mechanism treats each such instance as a request for a small page. If the mechanism does not receive a page request in block 306, operation of block 306 repeats until a page request is received. If the mechanism receives a page request in block 306, operation returns to blocks 303 and 304 to retrieve the small page and mark the small page as valid.

If the large page address range is full in block 305, the mechanism switches to large page mapping (block 307), and operation ends (block 308).

FIG. 4 is a flowchart illustrating operation of a mechanism for decomposing a large page to small page mapping in accordance with an illustrative embodiment. Operation begins (block 400), and the mechanism allocates an address range for a large page (block 401) and generates a large page mapping (block 402). The mechanism my generate a large page mapping by switching from small page mapping to large page mapping, as described above with respect to FIG. 3, or by paging in a large page responsive to a page fault.

The mechanism then determines whether to exclude a small page within the large page mapping (block 403). The mechanism may use layered overlay, which uses multiple mappings to the same memory region at different granularities. The mechanism may exclude a page responsive to a copy-on-write operation and/or demand-based fetching, for example. If the mechanism determines to exclude a small page, the mechanism marks the small page as invalid in the small page mapping (block 404). Thereafter, or if the mechanism does not determine that a small page is to be excluded in block 403, the mechanism determines whether to free memory (block 405). If the operating system does not need to free memory, operation returns to block 403 to determine whether to exclude a small page.

If the operating system needs to free memory in block 405, the mechanism switches to a small page mapping (block 406). The mechanism then frees the physical memory associated with invalid small pages (block 407). Thereafter, operation ends (block 408).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for automatic use of large pages. In the illustrative embodiments, an operating system loader performs aggressive contiguous allocation followed by demand paging of small pages into a best-effort contiguous and naturally aligned physical address range sized for a large page. The operating system detects when the large page is fully populated and switches the mapping to use large pages. If the operating system runs low on memory, the operating system can free portions and degrade gracefully.

The illustrative embodiments remove the software and system barriers to the use of large pages. The mechanism of the illustrative embodiments transparently improves the applicability of large pages to existing and future software applications. The illustrative embodiments enable efficient use of page table entries and associated caches by default. The mechanism of the illustrative embodiments is good for performance, efficiency, and virtualization.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for automatic use of large pages, the method comprising:
responsive to a page request, allocating a contiguous and naturally aligned physical address range for a large page in physical memory, retrieving a small page into a corresponding portion of physical memory for the small page within the address range for the large page, and mapping the small page using a small page mapping table;
responsive to a subsequent page-in of a small page to the address range for the large page resulting in the large page being fully populated with valid small pages, mapping the large page using a large page mapping table; and responsive to the subsequent page-in resulting in the large page being fully populated with valid small pages, switching to large page mapping for subsequent accesses to the address range for the large page.

2. The method of claim 1, wherein mapping the small ge using the small page mapping table comprises:

marking the small page as valid using a page protection bit in the small page mapping table.

3. The method of claim 2, further comprising:

responsive to a copy-on-write operation for an address corresponding to a given small page within the address range for the large page, performing the copy-on-write operation on the given small page and marking the given small page invalid in the small page mapping table.

4. The method of claim 2, further comprising:

responsive to demand-based fetching for an address corresponding to a given small page within the address range for the large page, performing the demand-based fetching on the given small page and marking the given small page invalid in the small page mapping table.

5. The method of claim 1, further comprising:

responsive to a copy-on-write operation for an address corresponding to a given small page within the address range for the large page, performing the copy-on-write operation on the given small, page; and switching to small page mapping for the address range for the large page.

6. The method of claim 1, further comprising:

responsive to the operating system kernel needing memory, switching to small page mapping for the address range for the large page and freeing physical memory corresponding to invalid small pages within the address range for the large page.

7. A computer program product comprising a computer readable storage medium having a computer readable program stored therein, wherein the computer readable program, when executed on a computing device, causes the computing device to:

responsive to a page request, allocate a contiguous and naturally aligned physical address range for a large page in physical memory, retrieve a small page into a corresponding portion of physical memory for the small page within the address range for the large page, and map the small page using a small page mapping table;

responsive to a subsequent page-in of 'a small page to the address range for the large page resulting in the large page being fully populated with valid small pages, map the large page using a large page mapping table; and responsive to the subsequent page-in resulting in the large page being fully populated with valid small pages, switch to large page mapping for subsequent accesses to the address range for the large page.

8. The computer program product of claim 7, wherein mapping the small page using the small page mapping table comprises:

marking the e as valid using a page t ion bit in the small page mapping table.

9. The computer program product of claim 8, wherein the computer readable program further causes the computing device to:

responsive to a copy-on-write operation for an address corresponding to a given small page within the address range for the large page, perform the copy-on-write operation on the given small page and mark the given small page invalid in the small page mapping table.

10. The computer program product of claim 8, wherein the computer readable program further causes the computing device to:

responsive to demand-based fetching for an address corresponding to a given small page within the address range for the large page, perform the demand-based fetching on the given small page and mark the given small page invalid in the small page mapping table.

11. The computer program product of claim 7, wherein the computer readable program further causes the computing device to:

responsive to a copy-on-write operation for an address corresponding to a given small page within the address range for the large page, perform the copy-on-write operation on the given small page; and switch to small page mapping for the address range for the large page.

12. The computer program product of claim 7, wherein the computer readable program further causes the computing device to:

responsive to the operating system kernel needing memory, switch to small page mapping for the address range for the large page and free physical memory corresponding to invalid small pages within the address range for the large page.

13. The computer program product of claim 7, wherein the computer readable program is stored in a computer readable storage medium in as data processing system and wherein the computer readable program was downloaded over a network from a remote data processing system.

14. The computer program product of claim 7, wherein the computer readable program is stored in a computer readable storage medium in a server data processing system and wherein the computer readable program is downloaded over a network to a remote data processing system for use in a computer readable storage medium With the remote system.

15. An apparatus, comprising:

a processor; and a memory coupled to the processor, wherein the memory comprises instructions which, when executed by the processor, cause the processor to:

responsive to a page request, allocate a contiguous and naturally aligned physical address range for a large page in physical memory, retrieve a small page into a corresponding portion of physical memory for the small page within the address range for the large page, and map the small page using a small page mapping table;

responsive to as subsequent page-in of a small page to the address range for the large page resulting in the large page being fully populated with valid small pages, map the large page using a large page mapping table; and responsive to the subsequent page-in resulting in the large page being fully populated with valid small pages, switch to large page mapping for subsequent accesses to the address range for the large page.

16. The apparatus of claim 15, wherein mapping the small page using the small page mapping table comprises:

marking the small page as valid using a page protection bit in the small page mapping table.

17. The apparatus of claim 16, wherein the instructions further cause the processor to:

responsive to a copy-on-write operation for an address corresponding to a given small page within the address range for the large page, perform the copy-on-write operation on the given small page and mark the given small page invalid in the small page mapping table.

18. The apparatus of claim 16, wherein the instructions further cause the processor to:
responsive to demand-based fetching for an address corresponding to a given small page within the address range for the large page, perform the demand-based fetching on the given small page and mark the given small page invalid in the small page mapping table.

19. The apparatus of claim 15, wherein the instructions further cause the processor to:
responsive to a copy-on-mite operation for an address corresponding to a given small page within the address range for the large page, perform the copy-on-write operation on the given small page; and
switch to small page mapping for the address range for the large page.

20. The apparatus of claim 15, wherein the instructions further cause the processor to:
responsive to the operating system kernel needing memory, switch to small page mapping for the address range for the large page and free physical memory corresponding to invalid small pages within the address range for the large page.

* * * * *